United States Patent [19]
Aoki et al.

[11] Patent Number: 4,914,528
[45] Date of Patent: Apr. 3, 1990

[54] DETECTION OF A SYNCHRONIZING SIGNAL IN A MAGNETIC RECORDING/REPRODUCING APPARATUS

[75] Inventors: Takayoshi Aoki; Masayuki Takeda, both of Kanagawa; Yutaka Masumoto, Suitama, all of Japan

[73] Assignee: Pioneer Electronic Corporation, Tokyo, Japan

[21] Appl. No.: 52,818

[22] Filed: May 22, 1987

[30] Foreign Application Priority Data

May 22, 1986 [JP] Japan ............................. 61-118003

[51] Int. Cl.⁴ .............................................. G11B 5/09
[52] U.S. Cl. .................................................. 360/46
[58] Field of Search ............................. 360/46, 51, 67

[56] References Cited

U.S. PATENT DOCUMENTS

| 4,480,276 | 10/1984 | Barey et al. | 360/46 |
| 4,495,529 | 1/1985 | Gustafson | 360/46 |
| 4,564,876 | 1/1985 | Kiramura | 360/46 |
| 4,729,045 | 3/1988 | Baugh | 360/46 |
| 4,751,591 | 6/1988 | Fujimoto | 360/46 |

Primary Examiner—Vincent P. Canney
Attorney, Agent, or Firm—Sughrue, Mion, Zinn, Macpeak & Seas

[57] ABSTRACT

A synchronizing signal extraction circuit for digital magnetic tape decks, in which a level of a synchronizing signal is differentiated and compared against a minimum level. The synchronizing signal is used for reproduction purposes only if the differentiated synchronizing signal exceeds the minimum level. Thereby, old incompletely erased synchronizing signals are masked.

6 Claims, 2 Drawing Sheets

FIG. 1 PRIOR ART
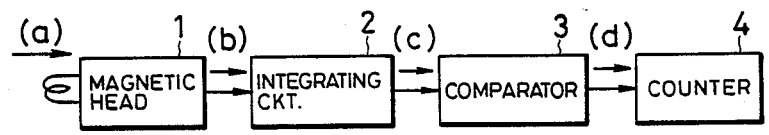
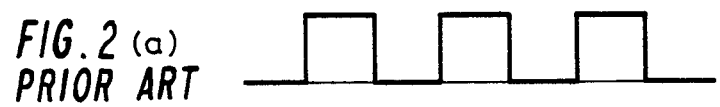
FIG.2 (a) PRIOR ART
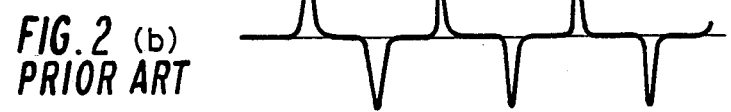
FIG.2 (b) PRIOR ART
FIG.2 (c) PRIOR ART
FIG.2 (d) PRIOR ART

DETECTION OF A SYNCHRONIZING SIGNAL IN A MAGNETIC RECORDING/REPRODUCING APPARATUS

BACKGROUND OF THE INVENTION

1. Field of the Invention

The present invention relates to a magnetic recording/reproducing apparatus such as used i nan R-DAT (rotary head-digital audio tape deck). In particular, it relates to the extraction of a synchronizing signal.

2. Background of the Invention

In a recently standardized R-DAT, a pilot signal and a synchronizing signal for detecting the pilot signal are recorded in each inclined track by a rotary magnetic head so as to perform tracking for the inclined track. A pilot signal level (a crosstalk component) produced from a right adjacent track is detected when the synchronizing signal is detected. Also, a pilot signal level (a crosstalk component) produced from a left adjacent track after a predetermined time has passed from the point in time of detecting the synchronizing signal to be zero is detected. These two detected levels are compared to produce a tracking error signal on the basis of a difference between the detected levels.

In order to detect such a synchronizing signal, a device as shown in FIG. 1 is considered such as is a possibility. That is, the synchronizing signal, which is pulse-coded and recorded on a magnetic tape and which has a pattern such as that shown in FIG. 2(a), is reproduced by a magnetic head 1 which traces the inclined track while it is rotating. The magnetic head 1 constitutes a kind of a differentiation circuit, and produces an output signal as shown in FIG. 2(b). The output signal is applied to an integrating circuit 2 to be integrated therein to be restored into the original signal as shown in FIG. 2(c). The restored signal is applied to a comparator 3 to be compared with a predetermined reference level (zero level) so as to be shaped into a signal such as is shown in FIG. 2(d). The shaped signal is applied to a counter 4 which acts as a reading circuit. The counter 4 counts the number of pulses in the input signal, and produces a detection signal indicating that the synchronizing signal has been detected when the number of counts reaches a predetermined numerical value, for example, 20.

The just-described device, being arranged merely to count an output signal of the magnetic head 1 by the counter 4 through the integrating circuit 2 and the comparator 3, has a disadvantage in that the device is poorly protected against noise. For example, in a system in which no exclusive erasing head is provided and old information is erased by over-writing new information on top of the old information, there is a disadvantage in that an old synchronizing signal corresponding to the old information is not sufficiently erased because of its relatively low frequency so that the old synchronizing signal is erroneously detected, making correct tracking control impossible.

SUMMARY OF THE INVENTION

It is therefore an object of the present invention to eliminate the disadvantages in the prior art.

It is another object of the present invention to provide a magnetic recording/reproducing apparatus in which an output signal produced from a magnetic head is differentiated in a differentiation circuit and in which a normal signal and a non-erased signal are discriminated from each other in accordance with the differentiated signal.

In order to attain the above objects, according to the present invention, the magnetic recording/reproducing apparatus comprises a magnetic head for reproducing a signal recorded on a recording medium, a reading circuit for reading an output signal of the magnetic head, a differentiating circuit for differentiating the output of the magnetic head, a discrimination circuit for discriminating a normal signal from an output signal of the differentiating circuit, and a control circuit for allowing the reading circuit to read the normal signal when the discrimination circuit discriminates the normal signal.

The output signal of the magnetic head is differentiated by the differentiating circuit and the discrimination circuit discriminates the normal signal from the non-erased signal on the basis of the differentiated signal. The control circuit allows the reading circuit to read out the output signal of the magnetic head only when the normal signal is discriminated.

BRIEF DESCRIPTION OF THE DRAWINGS

FIG. 1 is a block diagram of a conventional magnetic recording/reproducing apparatus.

FIG. 2(a)-(d) are a diagram showing waveforms of various signals in the conventional apparatus.

DETAILED DESCRIPTION OF PREFERRED EMBODIMENT

Figure 3:
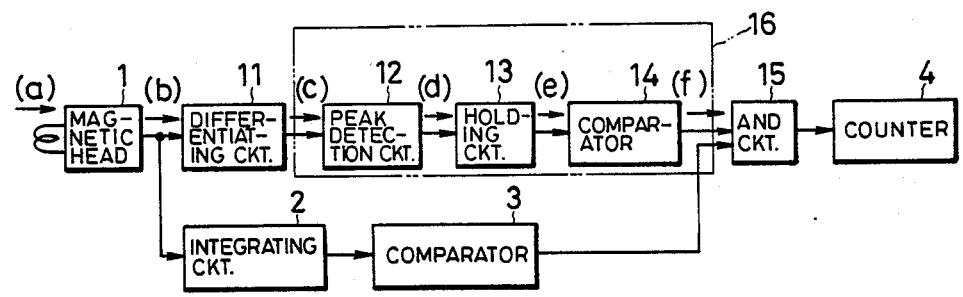
FIG. 3 is a block diagram of a magnetic recording/reproducing apparatus according to the present invention.

FIG. 3 is a block diagram of an embodiment of the magnetic recording/reproducing/apparatus according to the present invention. The parts of FIG. 3 corresponding to those in FIG. 1 are correspondingly referenced and the detailed description as to those parts will be omitted.

In FIG. 1, a differentiating circuit 11 differentiates an output signal of a magnetic head 1. An output signal of the differentiating circuit 11 is applied to a discrimination circuit 16. In the embodiment the discrimination circuit 16 is constituted by a peak detection circuit 12 for detecting a peak value of the output of the differentiating circuit 11, a holding circuit 13 for holding an output of the peak detection circuit 12, and a comparator 14 for comparing an output signal of the holding circuit 13 with a predetermined reference value. An AND circuit 15 acting as a control circuit allows a reading circuit or counter 4 to read (count) the signal produced from the magnetic head 1 when a detection signal representing detection of a normal signal is produced from the discrimination circuit 16. The AND circuit 15 may be incorporated in the counter 4 or may be constituted by a microcomputer, or the like. The other parts are arranged in the same manner as in FIG. 1.

The operation of the apparatus will be described hereunder. When a new synchronizing signal (FIG. 4(a)) acting as a normal signal is recorded on a magnetic tape, the magnetic head 1, which acts as a differentiator, produces a positive and a negative pulse at a leading and a trailing edge of the synchronizing signal, respectively (FIG. 4(b)). The pulse signal is integrated by an integrating circuit 2 and compared with a predetermined reference value in a comparator 3. The respective output signals produced by the integrating circuit 2 and the comparator 3 being shown in FIGS. 2(c) and 2(d).

Figure 4:
FIGS. 4 and 5(a)-(f) are diagrams showing waveforms of various signals in the apparatus of FIG. 3.

On the other hand, the output signal of the magnetic head 1 is applied also to the differentiating circuit 11 to be differentiated therein (FIG. 4(c)). Accordingly, the differentiating property of the magnetic head 1 is further emphasized. The normal synchronizing signal has a large level and includes a number of higher-harmonic components so that the peak value of the output signal of the differentiating circuit 11 becomes large. The peak detection circuit 12 compares the output signal of the differentiating circuit 11 with a reference signal and produces, for example, a positive signal (FIG. 4(d)) when the positive level of the output signal is larger than a reference voltage $V_1$ or the negative level is smaller than another negative reference voltage $V_2$. Apparently, it is a matter of course that only a single peak value of either polarity may be detected. The holding circuit 13 holds the level of the output signal of the peak detection circuit 12 (FIG. 4(e)). An output signal of the holding circuit 13 is applied to the comparator 14 so as to be compared with a predetermined reference voltage $V_3$. When a normal synchronizing signal is detected, the comparator 14 produces a signal of logic "H" as an input into the AND circuit 15 (FIG. 4(f)) because the output signal of the holding circuit 13 is larger than a reference voltage $V_3$. Accordingly, the AND circuit 15 is enabled to pass the signal applied from the comparator 3 to the counter 4.

Figure 5:
Figure 4:
Figure 5:
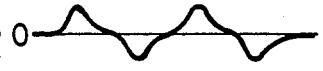
Figure 4:
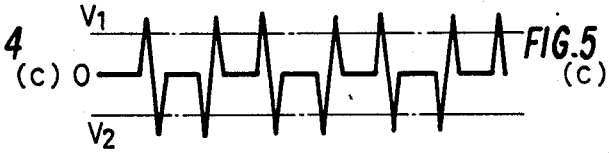
Figure 5:
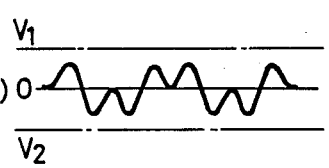
Figure 4:
Figure 5:
Figure 4:
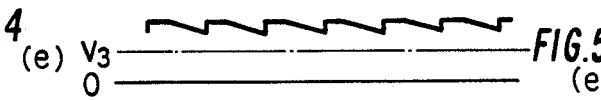
Figure 5:
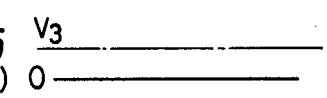
Figure 4:
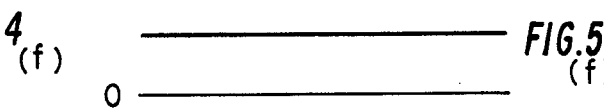
Figure 5:

On the other hand, when an incompletely erased synchronizing signal (FIG. 5(a)), which is not the normal one, remains on the magnetic tape, the level of the output signal of the magnetic head 1 (FIG. 5(b)) becomes small and the waveform loses its sharpness, that is, is made round. These effects arise because the non-erased synchronizing signal has a level smaller than that of the normal signal and the higher-harmonic components have been attenuated or removed. As a result, the level of the output signal of the differentiating circuit 11 (FIG. 5(c)) becomes small. As a result, no detection signal of the peak detection circuit 12 (FIG. 5(d)) is produced, and the output signal of the holding circuit 13 is maintained at a low level (zero level). Accordingly, the output signal of the comparator 14 (FIG. 5(e)) assumes a low logic level "L" to disable the AND circuit 15 (FIG. 5(f)). At that time, no pulse is applied to the counter 4 so that it becomes impossible to detect a synchronizing signal.

Although the discrimination circuit 16 is constituted by the peak detection circuit 12, the holding circuit 13, and the comparator 14 in the above embodiment, the arrangement may be modified such that, for example, a triggerable monostable multivibrator is triggered by a peak detection pulse. The present invention can be applied to any magnetic recording/reproducing apparatus other than the R-DAT.

According to the present invention, as described above, the magnetic recording/reproducing apparatus includes a magnetic head for reproducing a signal recorded on a recording medium, a reading circuit for reading an output signal of the magnetic head, a differentiating circuit for differentiating the output of the magnetic head, a discrimination circuit for discriminating a normal signal from an output signal of the differentiating circuit, and a control circuit for allowing the reading circuit to read the normal signal when the discrimination circuit discriminates the normal signal, whereby even if an abnormal signal remains owing to erroneous erasing, or the like, the signal is prevented from being erroneously detected, so that correct tracking control can be performed.

What is claimed is:

1. A magnetic recording/reproducing apparatus comprising:
    a magnetic head for reproducing a signal recorded on a recording medium;
    a differentiating circuit for differentiating an output signal of said magnetic head;
    a discrimination circuit for discriminating a normal signal from an output signal of said differentiating circuit;
    a reading circuit, responsive to an output of said discrimination circuit, for reading said output signal of said magnetic head; and
    a control circuit for allowing said reading circuit to read said output signal of said magnetic head only when said discrimination circuit discriminates said normal signal, said control circuit including enabling means, responsive to said output signal of said magnetic head, for enabling said control circuit to pass an output of said discrimination circuit.

2. An apparatus as recited in claim 1, wherein said discrimination circuit discriminates a high level as a normal signal.

3. An apparatus as recited in claim 2, wherein said discrimination circuit comprises a peak detection circuit receiving said output of said differentiating circuit and a first comparator discriminating said high level of a signal obtained from said peak detection circuit.

4. A magnetic recording/reproducing apparatus comprising:
    a magnetic head for reproducing a signal recorded on a recording medium;
    a differentiating circuit for differentiating an output signal of said magnetic head;
    a discrimination circuit for discriminating a normal signal from an ouput signal of said differentiating circuit, asid discrimination circuit discriminates a high level level as said normal signal, said discrimination circuit comprising a peak detection circuit receiving said output of said differentiating circuit and a first comparator discriminating said high level of a signal obtained from said peak detection circuit;
    a reading circuit for reading said output signal of said magnetic head, said reading circuit comprising a counter receiving an output of said control circuit; and
    a control circuit for allowing said reading circuit to read said output signal of said magnetic head only when said discrimination circuit discriminates said normal signal, said control circuit comprising an integrator receiving said output signal of said magnetic head, a second comparator receiving an output signal of said integrator, and a linear logic circuit receiving an output of said second comparator and an output of said first comparator.

5. A magnetic recording/reproducing apparatus comprising:
    a magnetic head for reproducing a signal recorded on a recording medium;
    a differentiating circuit for differentiating an output signal of said magnetic head;
    a discrimination circuit for discriminating a normal signal from an output signal of said differentiating circuit;

a reading circuit for said output signal of said magnetic head;

a control circuit for allowing said reading circuit to read said output signal of said magnetic head only when said discrimination circuit discriminates said normal signal;

an integrator receiving said output signal of said magnetic head; and a comparator receiving an output signal of said integrator, wherein said reading circuit comprises a counter receiving an output of said control circuit, and wherein said control circuit comprises a linear logic circuit receiving an output of said comparator and an output of said discrimination circuit.

6. A magnetic recording/reproducing apparatus comprising:

a magnetic head for reproducing a signal recorded on a recording medium;

a differentiating circuit for differentiating an output signal of said magnetic head;

a discrimination circuit for discriminating a normal signal from an output signal of said differentiating circuit, said discrimination circuit discriminating a high level as a normal signal;

a reading circuit for said output signal of said magnetic head;

a control circuit for allowing said reading circuit to read said output signal of said magnetic head only when said discrimination circuit discriminates said normal signal;

an integrator receiving said output signal of said magnetic head and a comparator receiving an output signal of said integrator, wherein said reading circuit comprises a counter receiving an output of said control circuit, and wherein said control circuit comprises a linear logic circuit receiving an output of said comparator and an output of said discrimination circuit.

* * * * *